United States Patent
Lindblad et al.

(10) Patent No.: US 8,893,976 B1
(45) Date of Patent: Nov. 25, 2014

(54) TAMPER-RESISTANT ELECTRONIC SYSTEM

(71) Applicant: Automated Assembly Corporation, Lakeville, MN (US)

(72) Inventors: Scott Lindblad, Lakeville, MN (US); David Neuman, Randolph, MN (US); Robert Neuman, Cannon Falls, MN (US)

(73) Assignee: Automated Assembly Corporation, Lakeville, MN (US)

( * ) Notice: Subject to any disclaimer, the term of this patent is extended or adjusted under 35 U.S.C. 154(b) by 0 days.

(21) Appl. No.: 13/945,016

(22) Filed: Jul. 18, 2013

(51) Int. Cl.
 *G06K 19/02* (2006.01)
 *G06K 19/077* (2006.01)
(52) U.S. Cl.
 CPC .............................. *G06K 19/07798* (2013.01)
 USPC ...... 235/488; 235/492; 340/572.1; 340/572.7
(58) Field of Classification Search
 USPC ..................... 235/488, 492; 340/572.1, 572.7
 See application file for complete search history.

(56) References Cited

U.S. PATENT DOCUMENTS

| | | | |
|---|---|---|---|
| 7,168,626 B2 | 1/2007 | Lerch et al. | |
| 7,277,016 B2 | 10/2007 | Moskowitz et al. | |
| 7,283,054 B2 | 10/2007 | Girvin et al. | |
| 7,479,887 B2 | 1/2009 | Meyer | |
| 7,855,649 B2 | 12/2010 | Masin | |
| 7,898,422 B2 | 3/2011 | Puccini | |
| 7,916,034 B1 | 3/2011 | Puccini | |
| 8,282,011 B1 | 10/2012 | Skoine et al. | |
| 8,387,871 B2 | 3/2013 | Fratti | |
| 2002/0135481 A1* | 9/2002 | Conwell et al. | 340/572.1 |
| 2008/0143519 A1* | 6/2008 | Piotrowski | 340/540 |
| 2009/0128340 A1 | 5/2009 | Masin | |
| 2012/0145794 A1 | 6/2012 | Mieslinger | |
| 2013/0075479 A1 | 3/2013 | Mieslinger | |

* cited by examiner

*Primary Examiner* — Allyson Trail
(74) *Attorney, Agent, or Firm* — Crawford Maunu PLLC

(57) ABSTRACT

A tamper-resistant electronic system includes a destructible vinyl (DV) substrate having conductive wiring disposed on a first surface of the DV substrate. An RFID device has pins mechanically and electrically connected to the wiring on the first surface of the DV substrate. A plate has a first surface, and a portion of the first surface of the plate is adhered to a portion of the first surface of the DV substrate. The plate has a cavity that encompasses the RFID device. A backing is adhered to a second surface of the plate opposite the first surface of the plate.

24 Claims, 4 Drawing Sheets

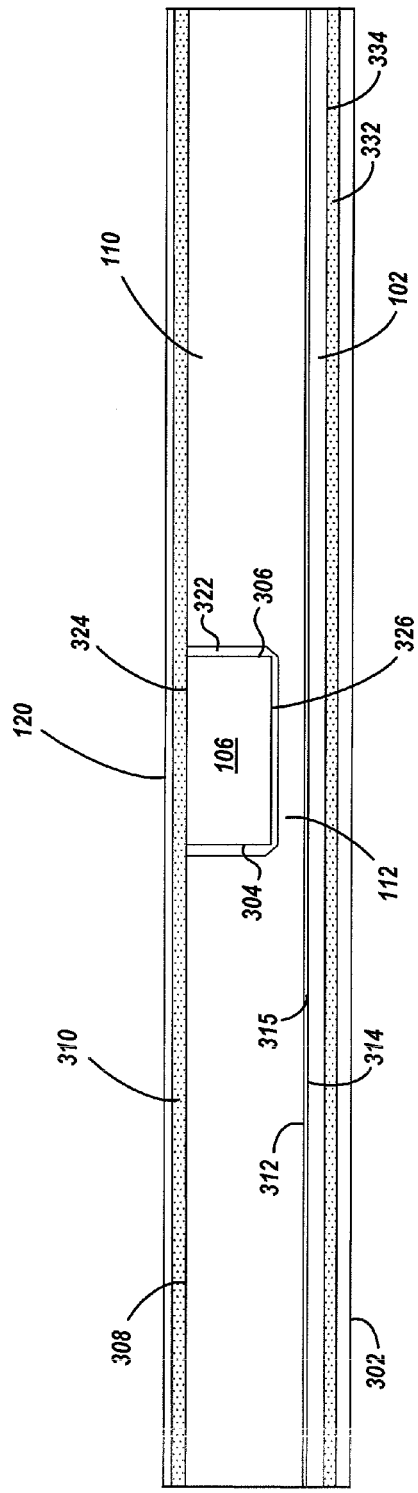
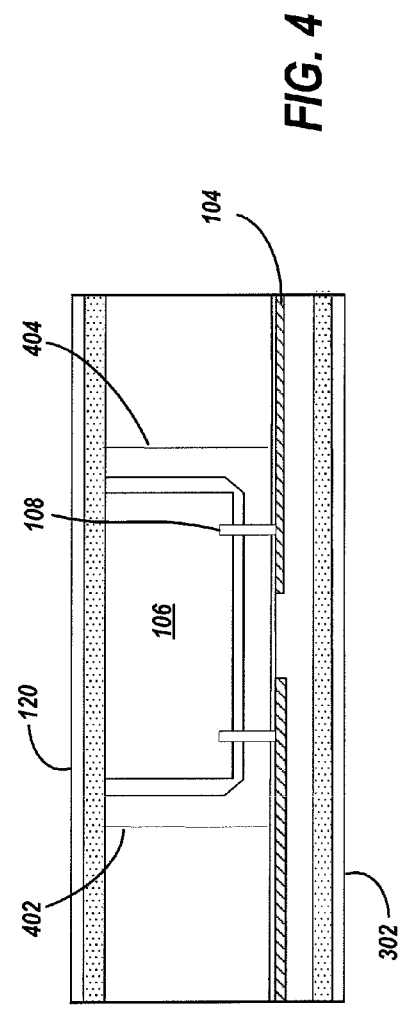
FIG. 3
FIG. 4

TAMPER-RESISTANT ELECTRONIC SYSTEM

FIELD OF THE INVENTION

The disclosure generally relates to tamper-resistant electronic systems.

BACKGROUND

Radio frequency identification (RFID) applications vary from inventory control to traffic management to pet identification. RFID systems generally include readers and tags. The RFID reader emits a signal to activate the RFID tag, and the RFID tag responds generally by reading data from a memory and emitting a signal with the desired information for the RFID reader.

In some traffic-related RFID applications, RFID tags are used for vehicle registration or to assess fees and account for use of toll roads. The RFID tags may be affixed to the windshields of vehicles whose owners have paid for registration or travel privileges. Such an RFID tag may be the target of theft since an amount has been prepaid and the RFID tag may be used in an unauthorized vehicle, at least until the theft is reported and countermeasures taken. Though countermeasures may be effective once the theft is reported, the costs to the user and the administrative agency may be burdensome.

SUMMARY

In one embodiment, a tamper-resistant electronic system includes a destructible vinyl (DV) substrate having conductive wiring disposed on a first surface of the DV substrate. An RFID device has pins mechanically and electrically connected to the wiring on the first surface of the DV substrate. A plate has a first surface, and a portion of the first surface of the plate is adhered to a portion of the first surface of the DV substrate. The plate has a cavity that encompasses the RFID device. A backing is adhered to a second surface of the plate opposite the first surface of the plate.

In another embodiment, a tamper-resistant electronic system includes a destructible vinyl (DV) substrate having conductive wiring disposed on a first surface of the DV substrate. An RFID device has pins mechanically and electrically connected to the wiring on the first surface of the DV substrate. A plate has a first surface and is more rigid than the DV substrate. A portion of the first surface of the plate, exclusive of an area of the first surface of the plate that surrounds the RFID device, is adhered to a portion of the first surface of the DV substrate. The plate has a cavity that encompasses the RFID device. A backing is adhered to a second surface of the plate opposite the first surface of the plate. An adhesive layer on a second surface of the DV substrate attaches a temporary backing to the DV substrate.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which:

FIG. 3 shows a partial cross-sectional view of the RFID tag of FIG. 2 taken in the direction of section lines 3;

FIG. 4 shows a partial cross-sectional view of the RFID tag of FIG. 2 taken in the direction of section lines 4;

DETAILED DESCRIPTION OF THE DRAWINGS

The disclosed tamper-resistant electronic system includes a destructible vinyl (DV) substrate, and the DV substrate has conductive wiring disposed on a first surface of the DV substrate. In one implementation, the conductive wiring provides an antenna for an RFID device having pins that are mechanically and electrically connected to the wiring. A plate has a cavity that encompasses the RFID device and a portion of the plate is adhered to a portion of the DV substrate. A backing is adhered to the surface of the plate that is opposite the surface of the plate that is attached to the DV substrate. In one implementation, the plate is more rigid than the DV substrate. The difference in rigidity between the plate and the DV substrate, and the plate being attached to the RFID device but not to the DV substrate in an area surrounding the RFID device, promotes destruction of the RFID tag when the tag is removed from an article to which the tag was attached.

Figure 1:
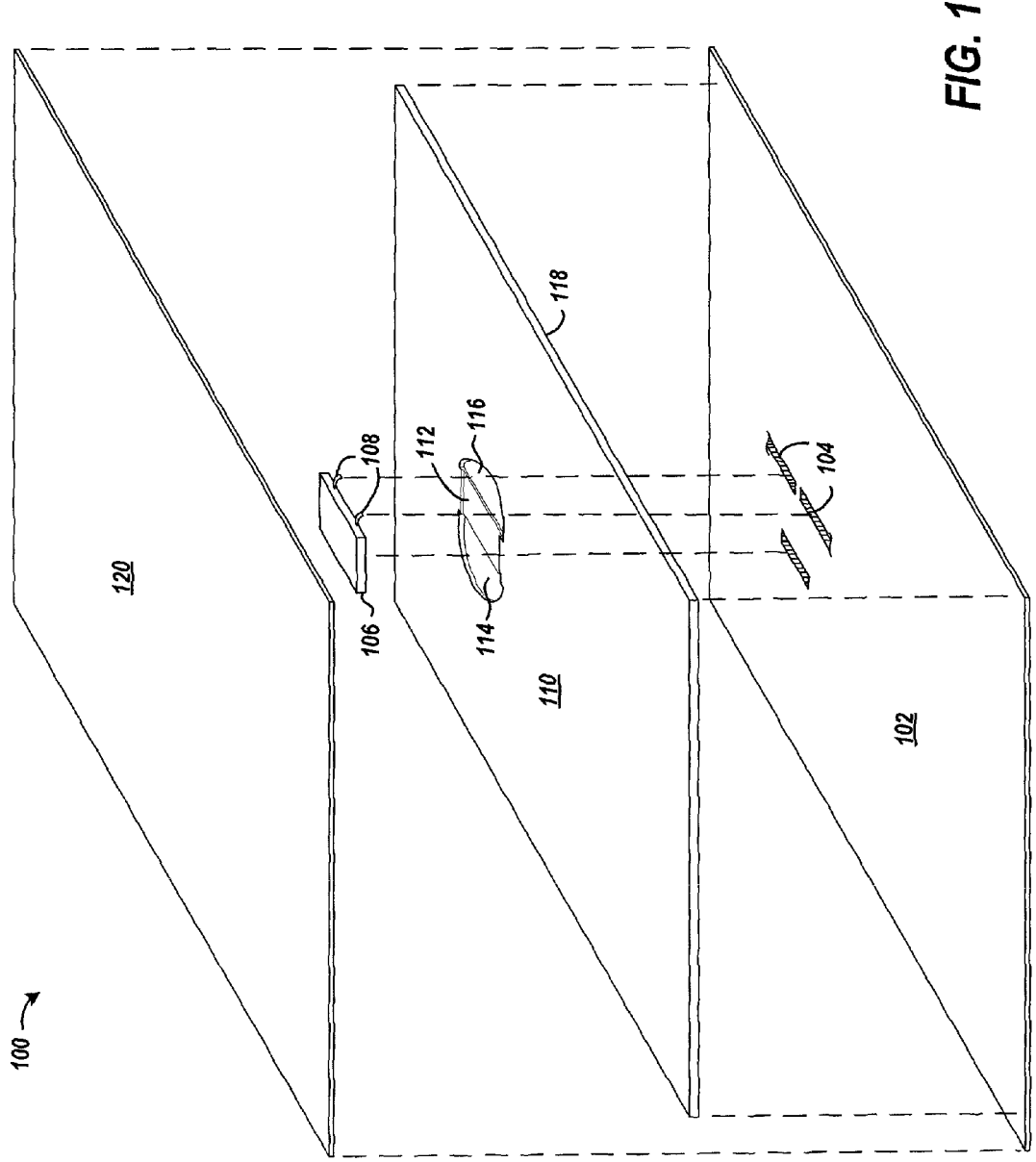
FIG. 1 shows an exploded view of a tamper resistant RFID tag.

FIG. 1 shows an exploded view of a tamper resistant RFID tag 100. The RFID tag includes a destructible vinyl (DV) substrate 102 having conductive wiring 104 disposed on one of the surfaces of the DV substrate. The portions of conductive wiring 104 shown are antenna leads in an example implementation, and additional wiring (not shown) forms an antenna for the RFID tag.

Figure 5:
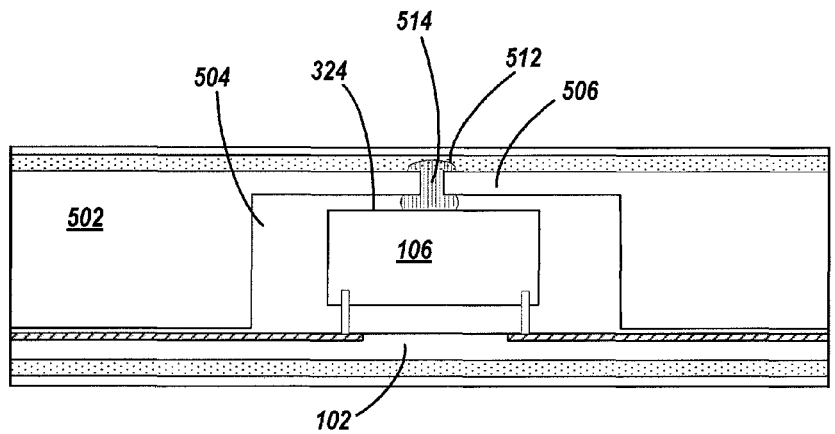
FIG. 5 shows a partial cross-sectional view of an RFID tag in which a portion of the plate is disposed over the RFID device.
Figure 6:
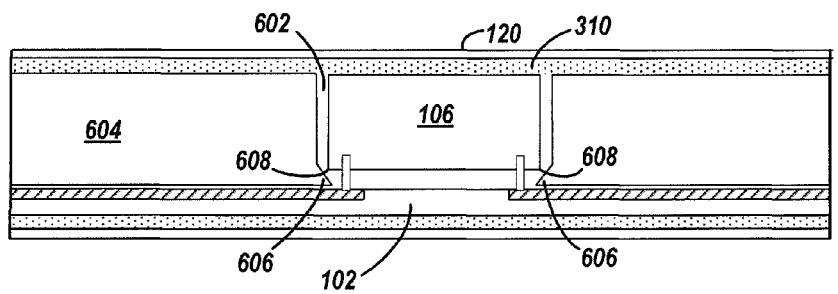
FIG. 6 shows a partial cross-sectional view of an RFID tag in which a cavity in the plate encompasses the RFID device, and edges formed by the cavity on the plate are disposed between edges of the RFID device and the DV substrate.

An RFID device 106 has pins 108 that are mechanically and electrically connected to the wiring on the DV substrate. A plate 110 has a cavity that encompasses the RFID device. The perimeter of the RFID device is surrounded by the cavity in the plate. The cavity in the example implementation of FIG. 1 forms a recessed portion 112 of the plate in which the RFID device is seated. Alternative implementations of the cavity are shown in FIGS. 5 and 6. Openings 114 and 116 in the plate permit pins 108 to connect to the conductive wiring 104. The plate may be made of acrylonitrile butadiene styrene (ABS) thermoplastic. In other implementations, an alternative non-conductive rigid material may be used in place of the ABS thermoplastic.

A portion of a surface of the plate 110 is adhered to part of the surface of the DV substrate 102. For example, a portion of the hidden surface of the plate is adhered to part of the illustrated surface of the DV substrate. In one implementation, the outer edges 118 of the plate are attached to the DV substrate.

A backing 120 is adhered to the illustrated surface of the plate, which is opposite the surface of the plate that faces the DV substrate. The backing may be vinyl in an example implementation. A pressure-sensitive or other type of adhesive may be used to adhere the backing to the DV substrate, to the RFID device, and to the plate.

In an example implementation, the plate 110 is more rigid than the DV substrate 102. In an application in which the RFID tag 100 is affixed to an article (e.g., a windshield), an attempt to peel the RFID tag from the article causes the plate 110 to separate from the DV substrate 102 at locations where the plate is not attached to the DV (such as the area surrounding the RFID device 106) and to separate the RFID device from the DV substrate, thereby destroying the electrical connection to the antenna wiring 104.

Figure 2:
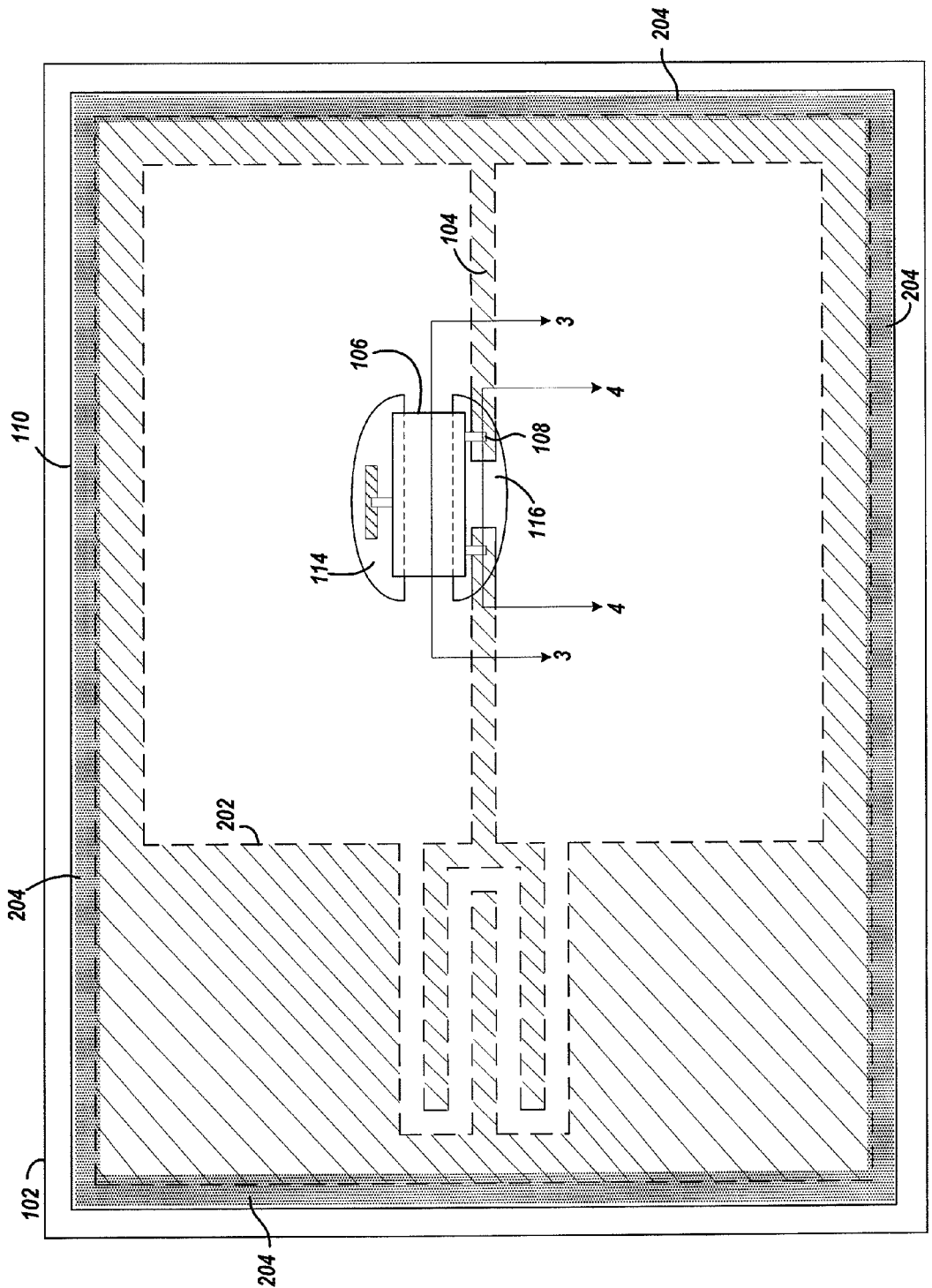
FIG. 2 shows a plan view of the RFID tag of FIG. 1.

FIG. 2 shows a plan view of the RFID tag of FIG. 1. The vinyl backing has been omitted from FIG. 2 in order to not obscure the plate 110 and RFID device 106. The features of the DV substrate 102 that are covered by the plate are shown with hidden lines (dashed). In particular, the dipole antenna is outlined with dashed lines 202. Though a dipole antenna is shown, it will be recognized that different applications may have different antenna configurations. In the example RFID tag, the plate covers the antenna as shown. It will be appreciated that in alternative implementations the plate may partially cover the antenna.

The plate is adhered to a portion of the surface of the DV substrate along the edges of the plate. Shaded strips 204 represent the adhesive along the edges of the plate. The adhesive may be excluded from other areas on the surface of the plate. Alternatively, adhesive may be at areas of the plate in addition to the edges. For example, the adhesive may be used at locations between the plate and the DV substrate such that an attempt to remove the RFID tag from an article to which it is affixed would cause the plate to separate from the DV substrate at key locations (e.g., breaking the antenna wiring).

In a particular implementation, the portion of the plate that is adhered to the DV substrate excludes an area that surrounds the RFID device. The absence of adhesive in the area surrounding the RFID device causes the plate to lift the RFID device away from the DV substrate and the pins 108 to separate from the antenna wiring 104 on the DV substrate when there is an attempt to remove the RFID tag from an object to which it is affixed.

FIG. 3 shows a partial cross-sectional view of the RFID tag of FIG. 2 taken in the direction of section lines 3. FIG. 3 includes the vinyl backing 120 shown in FIG. 1, though the vinyl backing is not shown in FIG. 2. The illustrated section of the RFID tag includes a removable backing 302, which is also not shown in FIG. 2.

The recessed portion 112 of the plate is disposed between the RFID device 106 and the DV substrate 102. In a particular implementation, the recessed portion extends from one side 304 of the RFID device to the opposite side 306 of the RFID device.

The cavity 322 encompasses the RFID device and leaves surface 324 of the RFID device, which is opposite the surface 326 that faces the DV substrate 102, exposed for attachment to the backing 120. The backing 120 is adhered to surface 308 of the plate and the surface 324 of the RFID device with a pressure-sensitive adhesive 310. The recessed portion 112 of the plate 110 between the RFID device 106 and the DV substrate 102, in combination with the backing 120 being attached to both the plate and the RFID device, promotes separation of the RFID device from the DV substrate during attempts to remove the RFID tag from an object.

Note that there is no adhesive between surface 312 of the plate and the facing surface 314 of the DV substrate 102 in the area that surrounds the RFID tag. Since the view of FIG. 3 is a partial cross-section of the RFID tag of FIG. 2, the adhesive along the edges of the plate (shaded strips 204 in FIG. 2) are not shown in FIG. 3. Gap 315 is shown to illustrate the absence of adhesive, though in the actual RFID tag surface 312 of the plate and surface 314 of the DV substrate may abut.

An adhesive layer 332 is disposed on surface 334 of the DV substrate, and a removable or temporary backing 302 is attached to the adhesive layer 332. The temporary backing and adhesive layer may be useful for peel-and-stick applications such that the temporary backing may be peeled from the adhesive layer and the RFID tag attached to a desired object by way of the adhesive layer 332.

FIG. 4 shows a partial cross-sectional view of the RFID tag of FIG. 2 taken in the direction of section lines 4. As with the cross-section of FIG. 3, FIG. 4 includes the vinyl backing 120 and the removable backing 302. The view shown in FIG. 4 also shows the conductive wiring 104 and the pins 108 of the RFID device 106 that are connected to the wiring. Note that lines 402 and 404 correspond to the intersection of cross-section line 4 (FIG. 2) and the edge of the opening 116.

FIGS. 5 and 6 show alternative configurations of the plate in an RFID tag. The cross-sectional views in FIGS. 5 and 6 are from a perspective that is similar to that of FIG. 4. FIG. 5 shows a partial cross-sectional view of an RFID tag in which a portion of the plate 502 is disposed over the RFID device 106.

The cavity 504 in the plate encompasses the RFID device, and the RFID device is disposed between the recessed portion 506 of the plate and the DV substrate 102. The recessed portion 506 of the plate may be glued to the surface 324 of the RFID device. In an example implementation glue 512 may be injected through opening 514 in the recessed portion 506 of the plate.

FIG. 6 shows a partial cross-sectional view of an RFID tag in which a cavity 602 in the plate 604 encompasses the RFID device 106, and edges 606 formed by the cavity on the plate are disposed between edges 608 of the RFID chip and the DV substrate 102. The edges 606 of the plate serve to pry the RFID device away from the DV substrate when an attempt is made to remove the RFID tag from an article. The cavity 602 leaves the surface of the RFID device exposed such that the vinyl backing 120 may be adhered to the RFID device with adhesive 310.

Figure 7:
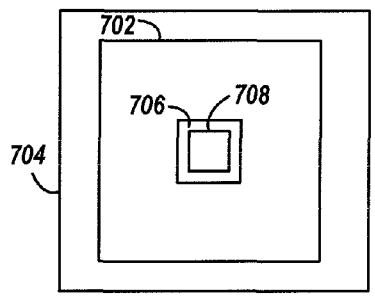
FIG. 7 shows a square plate disposed on a DV substrate.
Figure 8:
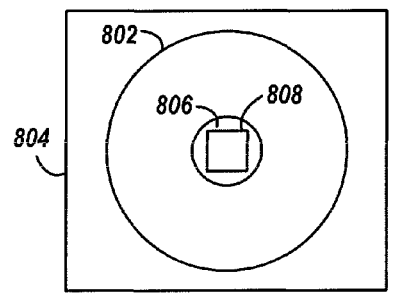
FIG. 8 shows a circular plate disposed on a DV substrate.

FIGS. 7 and 8 show alternative shapes of the plate. Depending on application requirements, the plate may be a regular or irregular polygon, circular, or any other suitable shape. FIG. 7 shows a square plate 702 disposed on a DV substrate 704. The cavity 706 encompasses RFID device 708. FIG. 8 shows a circular plate 802 disposed on a DV substrate 804. The cavity 806 encompasses RFID device 808. The shapes of the plates shown in FIGS. 7 and 8 may be combined with the different configurations shown in FIGS. 3, 5, and 7, for example.

In the example implementations (FIGS. 1-8), the plate may be approximately as thick as the RFID device 106. By making the plate approximately as thick as the RFID device, ridges, protrusions, or depressions in the exposed surface of the vinyl backing may be reduced or eliminated in the RFID tag. For applications in which smooth surfaces are not an issue, the plate may be thinner than the RFID device. In the implementation of FIG. 3, the plate is slightly thicker than the RFID chip to allow for the RFID device to be seated in the recessed portion, which is between the RFID device and the DV substrate. The thickness of the recessed portion 112 should be sufficient to separate the RFID device from the DV substrate without breaking when an attempt is made to remove the RFD tag from an article. Similarly, the thickness of the plates 502 and 604 in the implementations of FIGS. 5 and 6 are slightly thicker than the RFID device. In FIG. 5, the thickness should be sufficient for portion 506 of the plate to separate the RFID device from the DV substrate without breaking when an attempt is made to remove the RFID tag from an article. In FIG. 6, the thickness should be sufficient for edges 606 of the plate to separate the RFID device from the DV substrate without breaking when an attempt is made to remove the RFID tag from an article.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Though aspects and features may in some cases be described in individual figures, it will be appreciated that features from one figure can be combined with features of another figure even though the combination is not explicitly shown or explicitly described as a combination. The embodiments are thought to be applicable to a variety of RFID tags. Other aspects and embodiments will be apparent to those skilled in the art from consideration of the specification. It is intended that the specification and illustrated embodiments be considered as examples only, with a true scope of the invention being indicated by the following claims.

What is claimed is:

1. A tamper-resistant electronic system, comprising:
a destructible vinyl (DV) substrate having conductive wiring disposed on a first surface of the DV substrate;
an RFID device having pins mechanically and electrically connected to the conductive wiring on the first surface of the DV substrate;
a plate having a first surface, wherein a portion of the first surface of the plate is adhered to a portion of the first surface of the DV substrate, and the plate has a cavity that encompasses the RFID device; and
a backing adhered to a second surface of the plate opposite the first surface of the plate.

2. The tamper-resistant electronic system of claim 1, wherein the plate is more rigid than the DV substrate.

3. The tamper-resistant electronic system of claim 1, wherein the portion of the first surface of the plate that is adhered to the portion of the first surface of the DV substrate includes strips on the first surface of the plate along edges of the plate and excludes all other areas of the first surface of the plate.

4. The tamper-resistant electronic system of claim 1, wherein the portion of the first surface of the plate that is adhered to the portion of the first surface of the DV substrate excludes an area of the first surface of the plate that surrounds the RFID device.

5. The tamper-resistant electronic system of claim 1, wherein a portion of the plate is disposed between the RFID device and the DV substrate.

6. The tamper-resistant electronic system of claim 5, wherein the portion of the plate disposed between the RFID device and the DV substrate extends from one side of the RFID device to an opposite side of the RFID device.

7. The tamper-resistant electronic system of claim 1, wherein the backing is adhered to a first surface of the RFID device that is opposite a second surface of the RFID device that faces the first surface of the DV substrate.

8. The tamper-resistant electronic system of claim 1, wherein the RFID device is disposed between a recessed portion of the plate formed by the cavity and the first surface of the DV substrate.

9. The tamper-resistant electronic system of claim 8, wherein the recessed portion of the plate is glued to the first surface of the RFID device.

10. The tamper-resistant electronic system of claim 1, wherein the conductive wiring forms an antenna on the first surface of the DV substrate.

11. The tamper-resistant electronic system of claim 10, wherein the plate covers the antenna.

12. The tamper-resistant electronic system of claim 1, wherein the backing is vinyl.

13. The tamper-resistant electronic system of claim 1, wherein the plate is acrylonitrile butadiene styrene (ABS) thermoplastic.

14. The tamper-resistant electronic system of claim 1, wherein the plate is approximately as thick as the RFID device.

15. The tamper-resistant electronic system of claim 1, wherein pressure sensitive adhesive adheres the backing to the DV substrate, to the RFID device, and to the plate.

16. The tamper-resistant electronic system of claim 1, further comprising an adhesive layer on a second surface of the DV substrate, and a temporary backing attached to the adhesive layer on the second surface of the DV substrate.

17. The tamper-resistant electronic system of claim 1, wherein the plate is one of polygonal or circular.

18. The tamper-resistant electronic system of claim 1, wherein the cavity that encompasses the RFID device leaves a first surface of the RFID device that is opposite a second surface of the RFID device that faces the first surface of the DV substrate, exposed to the backing.

19. The tamper-resistant electronic system of claim 1, wherein the tamper-resistant electronic system further includes an adhesive between the backing and the plate.

20. The tamper-resistant electronic system of claim 1, wherein the tamper-resistant electronic system further includes an adhesive between the DV substrate and the plate.

21. A tamper-resistant electronic system, comprising:
a destructible vinyl (DV) substrate having conductive wiring disposed on a first surface of the DV substrate;
an RFID device having pins mechanically and electrically connected to the conductive wiring on the first surface of the DV substrate;
a plate having a first surface and being more rigid than the DV substrate, wherein a portion of the first surface of the plate, exclusive of an area of the first surface of the plate that surrounds the RFID device, is adhered to a portion of the first surface of the DV substrate, and the plate has a cavity that encompasses the RFID device;
a backing adhered to a second surface of the plate opposite the first surface of the plate; and
an adhesive layer on a second surface of the DV substrate, and a temporary backing attached to the adhesive layer on the second surface of the DV substrate.

22. The tamper-resistant electronic system of claim 21, wherein a portion of the plate is disposed between the RFID device and the DV substrate.

23. The tamper-resistant electronic system of claim 21, wherein the tamper-resistant electronic system further includes an adhesive between the backing and the plate.

24. The tamper-resistant electronic system of claim 21, wherein the tamper-resistant electronic system further includes an adhesive between the DV substrate and the plate.

* * * * *